Patented Oct. 17, 1922.

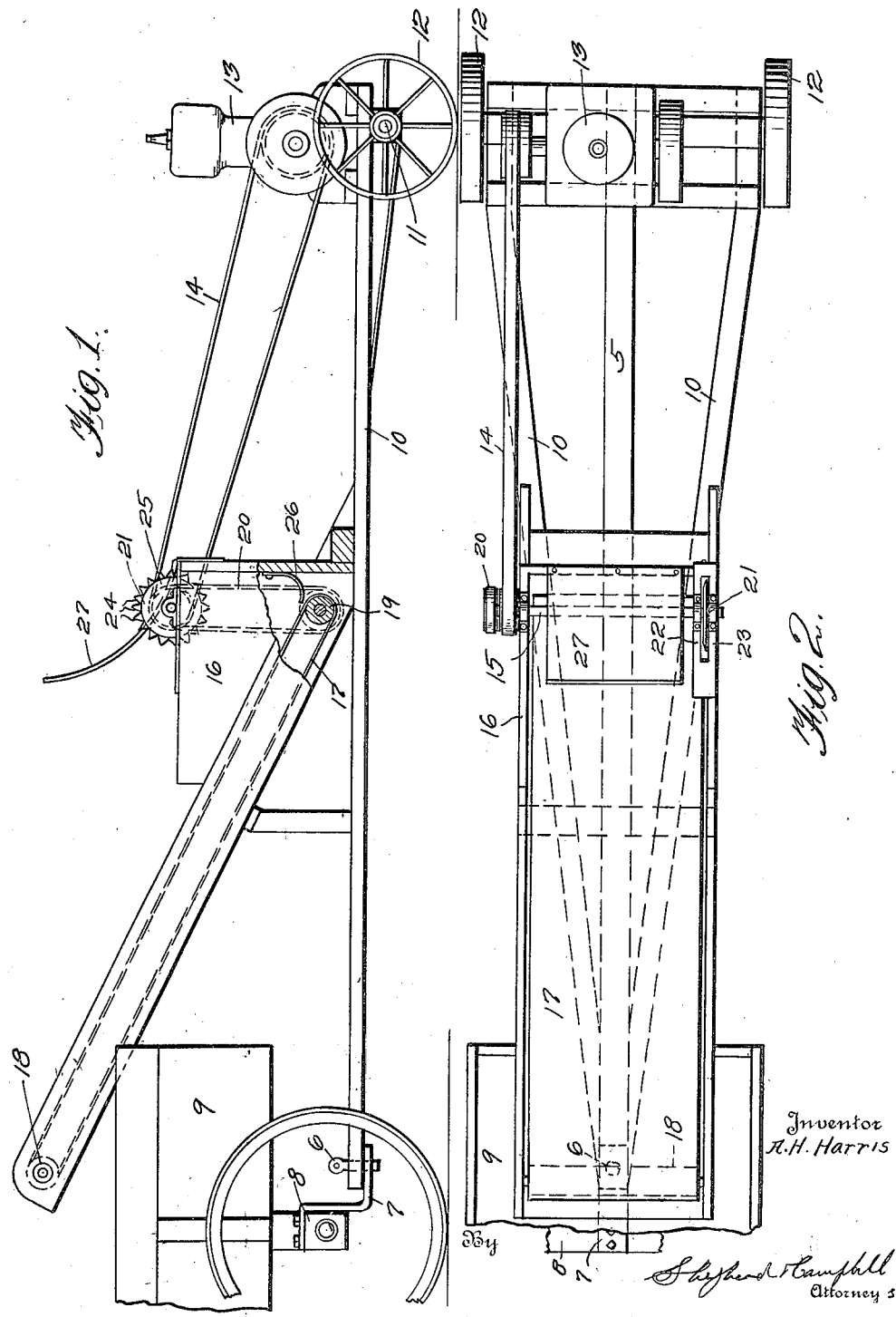

1,431,950

UNITED STATES PATENT OFFICE.

AMOS H. HARRIS, OF BLOOMINGTON, KANSAS.

CANE AND KAFIR CORN TOPPER.

Application filed March 22, 1921. Serial No. 454,372.

*To all whom it may concern:*

Be it known that I, AMOS H. HARRIS, a citizen of the United States of America, residing at Bloomington, in the county of Osborne and State of Kansas, have invented certain new and useful Improvements in Cane and Kafir Corn Toppers, of which the following is a specification, reference being had therein to the accompanying drawings.

This invention relates to a cane and Kafir corn topper and it has for its object to provide a device of simple and inexpensive construction which will rapidly sever the heads of cane and Kafir corn and deposit the severed heads upon a conveyor by which they are conveyed to and discharged into the body of a wagon, barge or other receptacle.

It is a further object of the invention to provide all of the elements necessary for carrying out the foregoing object upon a wheeled frame adapted to be attached to and move with the wagon or barge.

Further objects and advantages of the invention will be set forth in the detailed description which follows.

In the accompanying drawing:

Fig. 1 is a view partly in side elevation and partly in section of a device constructed in accordance with the invention; and Fig. 2 is a plan view thereof.

The frame of the device comprises a central longitudinally extending member 5 in the nature of a tongue which is adapted to have connection by means of a pin 6 with a hanger 7 fast upon the rear bolster 8 of the barge or wagon 9.

Braces 10 extend between the tongue 5 and a rear axle 11, the latter carrying ground wheels 12 upon which the structure as a whole is mounted to trail behind the barge 9. A motor such as a gasoline engine 13 is mounted substantially above the rear axle and drives by means of a belt 14 to a transverse shaft 15, the latter being supported upon a hopper 16. A belt conveyor 17 operable over rollers 18 and 19 and driven by the latter roller, serves to conduct the severed heads from the hopper 16 to the barge 9. The roller 19 is driven by a cross belt or chain 20 from the transverse shaft 15. The shaft 15 carries a cutting wheel 21 which operates between metal strips 22 and 23, said cutting wheel comprising a plurality of teeth 24. I have found that an economical way of constructing this cutting wheel is to employ a disc 25 and to make the teeth 24 of old mower sections, but the invention is not limited to this particular construction of the cutting wheel since I may employ other types of cutting wheels, if desired.

A baffle plate 26 extends transversely across the hopper and prevents the severed heads from falling between the roller 19 and the adjacent wall of the hopper. A second baffle plate 27 extends forwardly and upwardly over the hopper and prevents the severed heads from flying out of the hopper. The bundles of Kafir corn are placed upon the strips 22 and 23 with the heads projecting inwardly and overlying the lower portion of the conveyor and the bottom of the hopper. The bundles are then pushed against the cutting discs to cause the heads to be severed. These heads fall upon the conveyor and are carried up into the vehicle body 9 while the body or butt ends of the bundles are left entirely outside of the apparatus and are not carried up into the vehicle body 9.

It is to be understood that the invention is not limited to the precise construction set forth but that it includes within its purview whatever changes fairly come within either the terms or the spirit of the appended claim.

Having described my invention, what I claim is:

A device of the character described comprising an axle and ground wheels at the opposite ends thereof, a tongue extending forwardly therefrom, means for connecting said tongue to another vehicle, a motor mounted adjacent the rear axle and substantially thereover a hopper supported upon the tongue forwardly of the motor, said hopper being of considerable depth, a conveyor operating out of said hopper and discharging into the vehicle, a transverse shaft mounted upon said hopper above the lower end of the conveyor, metallic strips adjacent one edge of said hopper, a vertically rotative cutting knife operating between said strips and cooperating with said strips, means for driving said shaft from the motor, means for driving the conveyor from the shaft and a forwardly directed baffle plate extending from the rear edge of the hopper into position to engage the heads severed by the cutting knife and to direct the heads into the bottom of the hopper and upon the conveyor while the butt portions of the bundles from which said heads are severed remain outside of said hopper.

In testimony whereof I hereunto affix my signature.

AMOS H. HARRIS.